US012695415B1

(12) United States Patent (10) Patent No.: US 12,695,415 B1

Pashkevych (45) Date of Patent: Jul. 28, 2026

(54) PASS-THROUGH TRANSITION ENCLOSURE

(71) Applicant: Tesla, Inc., Austin, TX (US)

(72) Inventor: Mykola Pashkevych, Austin, TX (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 19/096,131

(22) Filed: Mar. 31, 2025

(51) Int. Cl.
| | |
|---|---|
| *H02S 40/34* | (2014.01) |
| *H01R 4/48* | (2006.01) |
| *H02G 3/08* | (2006.01) |
| *H02G 3/14* | (2006.01) |
| *H02G 3/16* | (2006.01) |
| *H02G 3/18* | (2006.01) |

(52) U.S. Cl.
CPC ............. *H02S 40/34* (2014.12); *H01R 4/483* (2023.08); *H02G 3/083* (2013.01); *H02G 3/14* (2013.01); *H02G 3/16* (2013.01); *H02G 3/18* (2013.01)

(58) Field of Classification Search
CPC ........ H02S 40/34; H01R 4/483; H02G 3/081; H02G 3/083; H02G 3/14; H02G 3/16; H02G 3/18
See application file for complete search history.

(56) References Cited

U.S. PATENT DOCUMENTS 10,686,308 B1 * 6/2020 Burks .................. H01R 9/2425
2023/0069530 A1 * 3/2023 Nakashima ............ H01H 85/20

FOREIGN PATENT DOCUMENTS

DE 202006003596 U1 * 7/2006 ............. H01R 9/223

OTHER PUBLICATIONS

Machine translation of DE-202006003596-U1, Butzer Werner. (Year: 2006).*

* cited by examiner

*Primary Examiner* — Mayla Gonzalez Ramos
(74) *Attorney, Agent, or Firm* — Foley & Lardner LLP

(57) ABSTRACT

A system including an enclosure is described herein, the enclosure having a housing and a lid coupled to the housing, the housing defining a first aperture and a second aperture. The system may include a pass-through connector coupled to an interior surface of the enclosure. The pass-through connector may comprise a body having an interior curved edge; a cap coupled to the body and comprising a pivot pin, wherein the pivot pin and the interior curved edge define a channel in the interior; a contact spring positioned in part within the channel; a terminal having a fastening region and a contact region; and an actuator having a first end and a second end, wherein the second end is in contact with the contact spring.

20 Claims, 16 Drawing Sheets

410

410

410

410

PASS-THROUGH TRANSITION ENCLOSURE

TECHNICAL FIELD

This application relates generally to electrical conductor pass-through enclosures.

BACKGROUND

Solar photovoltaic array systems require a reliable method to transition electrical connections between photovoltaic modules and power loads, such as an electrical inverter. This transition may involve connecting multiple photovoltaic strings while managing wire routing. However, conventional solutions often involve multiple bulky components, complex installations, and additional costs due to the need for intermediary junctions, external terminals, or pre-attached long leads.

As solar technology becomes more prevalent, there is an increasing demand for compact, serviceable, and easy-to-install wiring transition systems that can fit within confined spaces, such as under solar panels or roofing materials, without compromising accessibility or weather resistance.

SUMMARY

For the aforementioned reasons, there is a need for improved methods and systems for an integrated electrical transition enclosure and wire connection system that simplifies installation, enhances serviceability, and reduces overall footprint and height for compact installation while maintaining protection from external environmental factors. It is understood that the implementations of the systems and methods described herein may satisfy more, fewer, or different needs than those improvements described above without departing from the scope of the descriptions herein.

As described in further detail herein, an electrical pass-through transition enclosure may be used to transition between one or more photovoltaic modules and a power load such as an inverter. The electrical pass-through transition enclosure with one or more pass-through connectors allows electrical wires to be securely connected and transitioned within a sealed, weather-resistant housing while being mounted under the photovoltaic modules. The enclosure includes a removable lid, making it easy to access internal connections for installation and maintenance, while also providing environmental protection against moisture, dust, and debris.

Within the enclosure is one or more pass-through connectors, which feature a body, cap, contact spring, and actuator. The contact spring provides a firm electrical connection by gripping an inserted conductor, while the actuator allows for tool-free installation and removal of wires. The actuator has bimodal stability which allows it to securely lock in both an open (receiving) and closed (holding) position. In some embodiments, the system also includes extension conductors that exit the enclosure through designated apertures and have conductive connectors at the end, facilitating electrical transitions between different wiring types.

In one implementation, a system may include: an enclosure including: a housing defining a first aperture and a second aperture; and a lid removably coupled to the housing; and a pass-through connector coupled to an interior surface of the enclosure, the pass-through connector including: a body having an interior curved edge; a cap coupled to the body and defining an interior between the body and the cap, the cap including a pivot pin, wherein the pivot pin and the interior curved edge define a channel in the interior; a contact spring positioned in part within the channel; a terminal having a fastening region and a contact region, wherein the fastening region is positioned exterior to the interior defined by the body and the cap, and wherein the contact region is positioned within the interior defined by the body and the cap; and an actuator having a first end and a second end, wherein the second end is in contact with the contact spring.

The system may further include an extension conductor coupled to the fastening region of the terminal and extending through the second aperture to an exterior of the housing, the extension conductor having a conductive socket configured to receive a conductive connector from a photovoltaic module.

The lid may be hingedly coupled to the housing.

The cap may further include a recess, and the actuator may further include a protrusion configured to physically engage the recess in a holding position and physically disengage the recess in a receiving position.

When the actuator is in the holding position, the actuator may apply a force on the contact spring so that the contact spring pivots about the pivot pin toward the contact region of the terminal.

The body may further include (i) a cap protrusion configured to physically engage with a cap recess in the cap and (ii) a housing protrusion configured to physically engage with a mounting recess in the housing.

The contact spring may include a prong that engages a conductor inserted into the body of the pass-through connector when the actuator is in a holding position and applying a force onto an end of the contact spring opposite the prong.

The actuator may be configured to have bimodal stability with a first stable position in a receiving position and a second stable position in a holding position.

The housing and lid may have a height of less than 22 millimeters when coupled together.

The terminal may further include at least one wing at the fastening region, wherein the at least one wing is configured to couple to a conductor positioned proximate to the fastening region.

The terminal may further include a locating region positioned between the cap and the body, wherein the locating region includes a first bend positioned proximate a wall of the body.

The cap may further include a first indication and the actuator includes a second indication a distance from the first indication, wherein the distance is 20-25 millimeters.

The actuator may further include a fulcrum and a spring stop at the second end, wherein the spring stop and the fulcrum form a fork in the second end.

In another implementation, the techniques described herein relate to a method that may include: inserting a conductor into an enclosure, the enclosure including: a housing defining a first aperture and a second aperture, wherein the conductor is inserted into the first aperture; a lid removably coupled to the housing; and a pass-through connector coupled to an interior surface of the enclosure, the pass-through connector including: a body having an interior curved edge; a cap coupled to the body and defining an interior between the body and the cap, the cap including a pivot pin, wherein the pivot pin and the interior curved edge define a channel in the interior; a contact spring positioned in part within the channel; a terminal having a fastening region and a contact region, wherein the fastening region is positioned exterior to the interior defined by the body and the cap, and wherein the contact region is positioned within the interior defined by the body and the cap; and an actuator having a first end and a second end, wherein the second end is in contact with the contact spring; inserting the conductor into the pass-through connector; and actuating the actuator to apply a force to the contact spring to engage the conductor.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1:
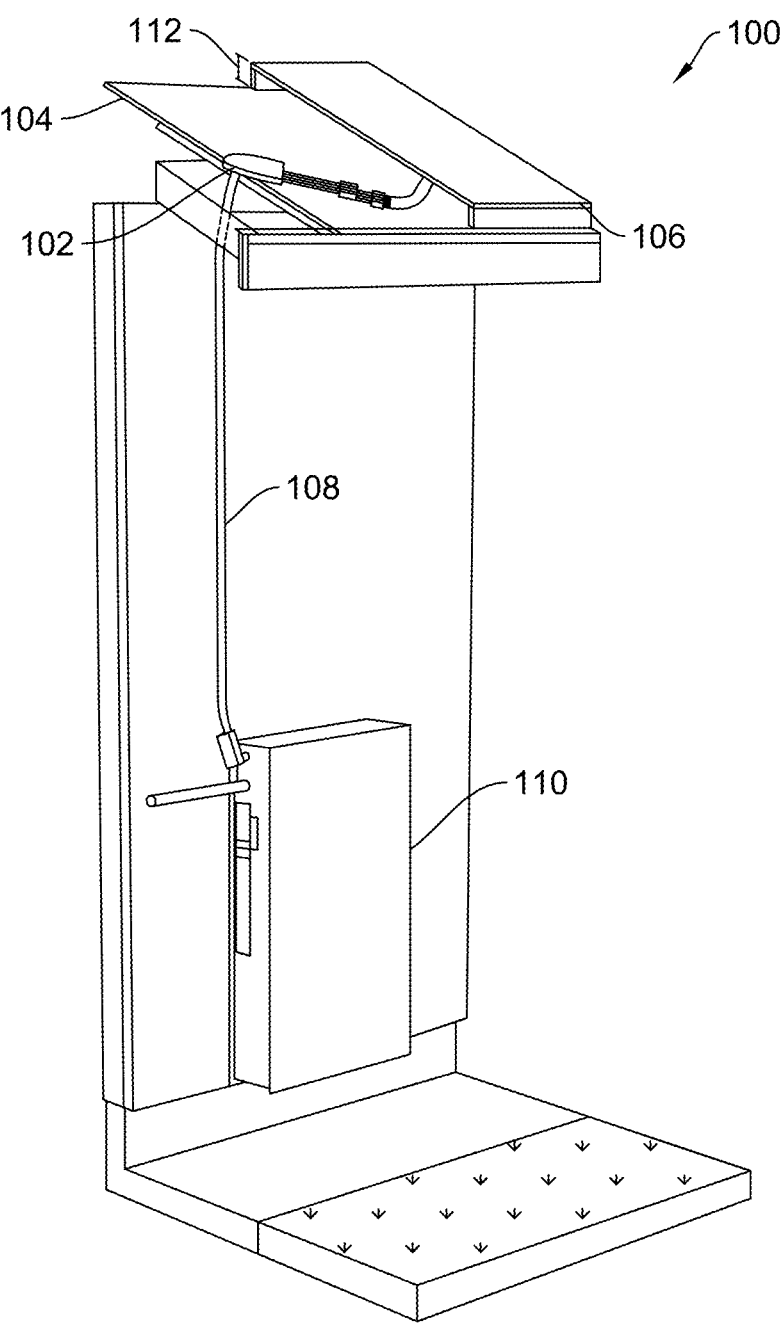
FIG. 1 illustrates a photovoltaic system, according to an embodiment.

Reference will now be made to some embodiments illustrated in the drawings, and specific language will be used here to describe the same. It will nevertheless be understood that no limitation of the scope of the embodiments of the methods and systems described herein is thereby intended. Alterations and further modifications of the features illustrated here, and additional applications of the principles of the embodiments of the methods and systems described herein, as illustrated here, which would occur to a person skilled in the relevant art and having possession of this disclosure, are to be considered within the scope of the embodiments, methods, and/or systems described herein.

FIG. 1 illustrates a portion of a photovoltaic system 100. The photovoltaic system 100 may comprise one or more solar modules, tiles, or panels (shown as a photovoltaic module 106) configured to capture solar radiation and convert it into electrical power. As an example, the photovoltaic system 100 could incorporate rigid framed solar panels for pitched-roof applications, flexible thin-film modules for curved or lightweight installations, or building-integrated photovoltaics that aesthetically blend into roofing materials.

Within the photovoltaic system 100, an enclosure 102 is provided. The enclosure 102 may be configured to house and protect electrical conductors used for transitioning between photovoltaic wiring from the photovoltaic module 106 and thermoplastic heat and water resistant (THWN) wiring (shown as conductor 108). The enclosure 102 could be fabricated from UV-stabilized plastic, powder-coated aluminum, or stainless steel, depending on environmental requirements. As described further herein, the enclosure 102 may feature additional gaskets or seals to achieve enhanced ingress protection ratings (e.g., IP67).

The enclosure 102 is mounted on a mounting surface 104. The mounting surface 104 may be configured to provide mechanical support and proper positioning for the enclosure 102. This mounting surface 104 could be a roof, deck, a metal racking system, or a prefabricated structural frame, each chosen to meet local code requirements and accommodate varying roof slopes or building styles. An alternative mounting method may involve ballasted systems or integrated attachment points designed specifically for solar installations.

Positioned proximate to the enclosure 102 is the photovoltaic module 106. The photovoltaic module 106 may be configured to generate electrical power from solar energy and could be any of a monocrystalline, polycrystalline, or thin-film type, depending on efficiency and aesthetic needs. In certain embodiments, the photovoltaic module 106 might be coupled with microinverters or power optimizers to optimize power generation and system monitoring.

The enclosure 102 includes one or more electrical connections (described in further detail herein) with one or more conductors, shown for example, as conductor 108. The conductors, such as the conductor 108, may be configured to route electrical current from the enclosure 102 toward a power load 110.

The conductor 108 may be 10 AWG THWN wire, bundled MC4 extension leads, or multi-strand cables with different gauge sizes. The power load 110 is positioned to receive and process the current from the conductor 108. This power load 110 may be an inverter, battery energy storage system, or electrical distribution panel, configured for commercial or residential use. In an alternative embodiment, the power load 110 could be part of a hybrid energy system that manages both solar input and grid interaction, supporting backup power or load shifting.

In at least one embodiment, the enclosure 102 has a height less than a distance 112, which extends from the mounting surface 104 to the photovoltaic module 106, thus allowing installation of the enclosure 102 between the photovoltaic module 106 and the mounting surface 104. The distance 112 could be sized to allow for airflow, compliance with fire setbacks, or maintenance access. In some embodiments, the distance 112 is defined by mounting brackets of the photovoltaic system 100 to which the photovoltaic module 106 is installed. The distance 112 may be 22 millimeters. While the distance 112 is described as 22 millimeters, it should be understood that the distance 112 may be more than 22 millimeters or less than 22 millimeters. For example, the distance may be 20-25 millimeters. Thus, the enclosure 102 may have a height less than 22 millimeters so as to allow the installation of the enclosure 102 between the mounting surface 104 (e.g., the roof) and a bottom surface of the photovoltaic module 106.

In like manner, the individual components of the system within the enclosure 102 may have a height of less than 22 millimeters (e.g., a pass-through connector, as described further herein), thus allowing the individual components of the system to be positioned within the enclosure 102 while still maintaining a height of less than 22 millimeters. In some embodiments, the enclosure 102 has a height of less than 22 millimeters when a housing and a lid are coupled together.

Figure 2:
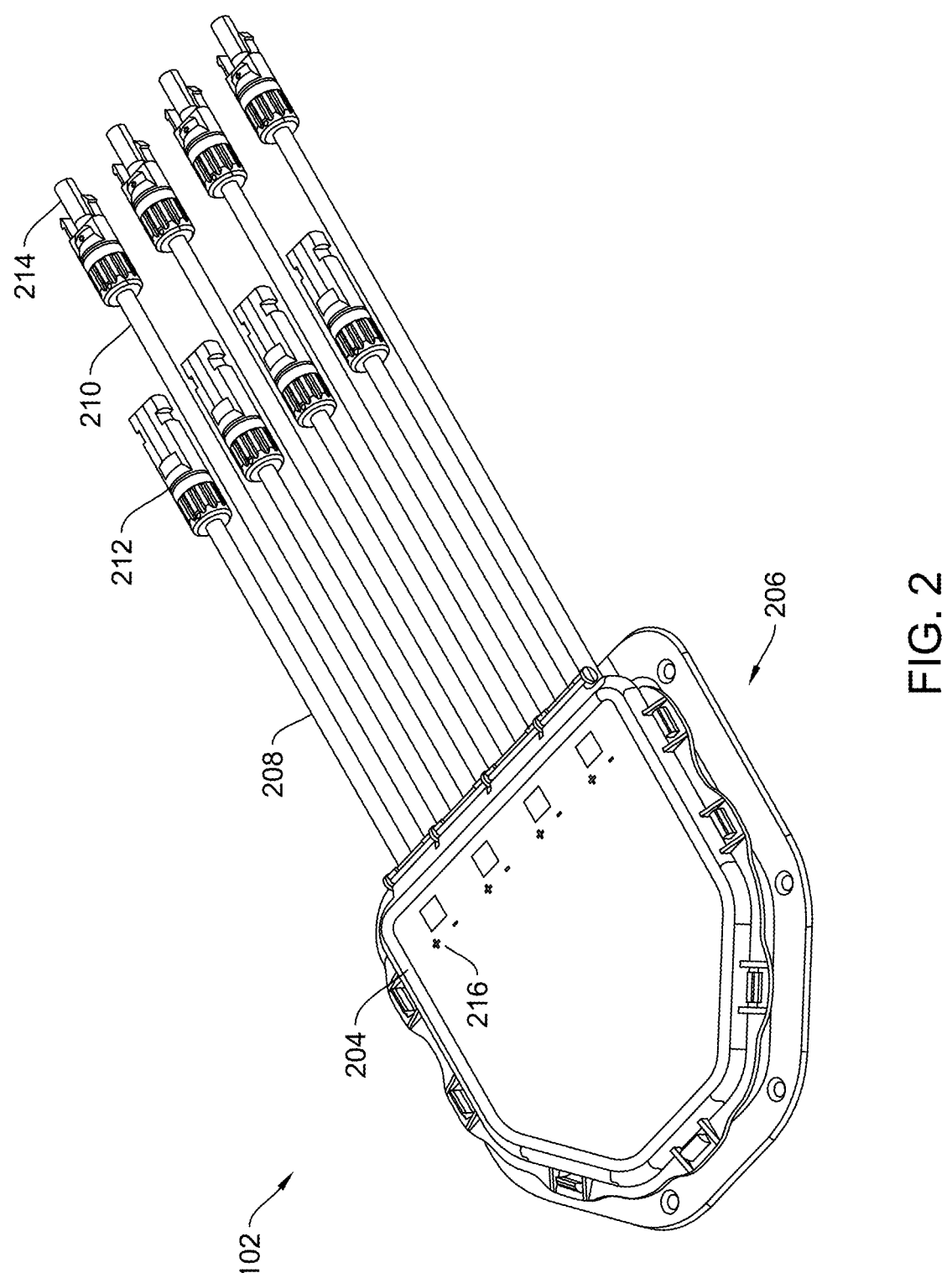
FIG. 2 is a perspective top view of an enclosure designed for transitioning between different electrical conductors, according to an embodiment.

FIG. 2 illustrates a perspective top view of the enclosure 102 designed for transitioning between different electrical conductors, by way of example, in the photovoltaic system 100 of FIG. 1. In some embodiments, the enclosure 102 is configured to provide a transition from electrical conductors of a photovoltaic module (e.g., the photovoltaic module 106 of FIG. 1) and a THWN wire (e.g., the conductor 108 of FIG. 1) that is electrically coupled to a power load (e.g., the power load 110 of FIG. 1).

The enclosure 102 includes a body, shown as body 206. The body 206 may be configured to house one or more components of the enclosure 102 or photovoltaic system 100 (e.g., a pass-through connector, a wire, etc.). The body 206 may be formed from a durable material such as UV-stabilized polymer, aluminum, or stainless steel to withstand environmental exposure and mechanical stresses. The body 206 defines an internal cavity configured to house and align housed components, such as the pass-through connector (described further herein) and other internal components. In certain embodiments, the body 206 incorporates integral partitions or mounting structures (such as partitions) that help position, separate, and/or secure conductors (e.g., the pass-through connectors), while also providing pathways for airflow or cable management. As an alternative, the body 206 may include modular inserts or removable panels for customization, allowing installers to adapt the enclosure 102 to various wire gauges or connection types.

The enclosure may include a lid 204. The lid 204 is configured to protect internal components from environmental factors, such as moisture, debris, and ultraviolet exposure, and may provide a secure, sealed interface when mated with the body 206 (as described herein). In certain embodiments, the lid 204 can be hinged or snap-fitted to allow convenient access to the interior for installation, inspection, and maintenance. The lid 204 may also be coupled to the body 206 in one or more other methods, such as by one or more fasteners, adhesives, slots, slides, etc. The enclosure 102 may also include one or more gaskets or sealing elements positioned between the lid 204 and the body 206 for ingress protection (e.g., an ingress protection of IP67). In some embodiments, the lid 204 incorporates a transparent or tinted panel to enable visual inspection of internal conductors without the need for removal, thereby streamlining routine checks in rooftop.

Figure 5:
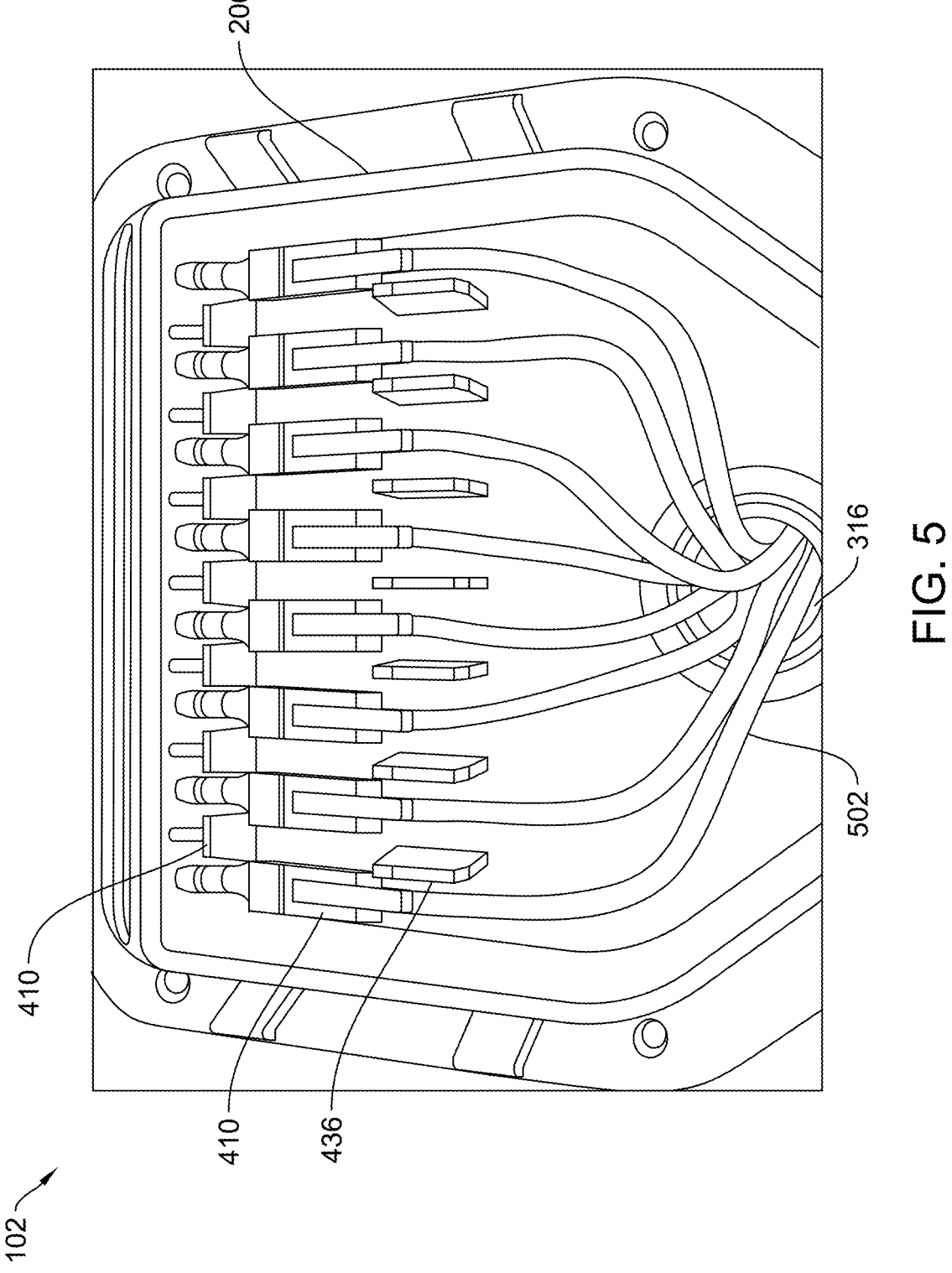
FIG. 5 is a perspective top view of an interior of an enclosure, according to an embodiment.

The enclosure 102 may include and/or be coupled to one or more extension conductors, shown as extension conductor 208, 210. The extension conductor 208 is configured to provide an electrical pathway from the enclosure's internal pass-through components to external wiring or devices (e.g., the photovoltaic module 106 of FIG. 1). In certain embodiments, the extension conductor 208 terminates in a plug or socket designed to couple with a photovoltaic connector to provide an efficient, tool-free integration into the photovoltaic system 100 of FIG. 1. The extension conductor 208 may be coupled (e.g., crimped, soldered, plugged, hardwired, etc.) to the enclosure 102 at a pass-through connector (e.g., as shown in FIG. 5) at a first end of the extension conductor 208. The extension conductor 208 may have a second end opposite the first end. The extension conductor 208 may terminate in a conductive socket 212 at the second end.

The conductive socket 212 is configured to receive a corresponding conductive connector (e.g., a plug), thereby facilitating a secure, repeatable, and/or reliable junction between the extension conductor 208 and another component of the photovoltaic system 100. In some embodiments, the conductive connector is electrically coupled to a photovoltaic cell or photovoltaic module (e.g., the photovoltaic module 106). In certain embodiments, the conductive socket 212 may be, in at least one example, an MC4-compatible conductive connector or a similar standardized interface used in photovoltaic installations. The conductive socket 212 can be designed to provide environmental sealing with one or more gaskets or weatherproofing chemicals (e.g., dielectric grease), thereby preventing moisture or debris ingress while maintaining a stable electrical contact. The extension conductor 208 may be adapted to terminate in different types of conductive connectors or wire harnesses, allowing the enclosure to accommodate multiple installation scenarios. The extension conductor 208 and/or the conductive socket 212 may be configured to transmit a polarity of electricity, such as a positive or negative voltage. This polarity may be indicated by one or more markings/indications, such as indicator 216. The indicator 216 may be a graphical and/or textual indicator of the polarity to which the extension conductor 208 is configured to transmit. By way of example, the indicator 216 is shown in FIG. 2 as a "+", indicating to an installer that the extension conductor 208 is to be electrically coupled to a positive polarity.

The extension conductor 210 of FIG. 2 may be substantially similar to the extension conductor 208. In some embodiments, the extension conductor 208 includes a conductive socket 212 at the second end while the extension conductor 210 includes a plug 214 at the second end of the extension conductor 210. In this way, a mixing of polarities from an electrical source is avoided. The plug 214 may be configured to be inserted into, or otherwise coupled with, a conductive connector, such as a socket that is coupled to a photovoltaic cell. The conductive connector may be a socket, plug, or other compatible connector with an electrically conductive core.

Figure 3:
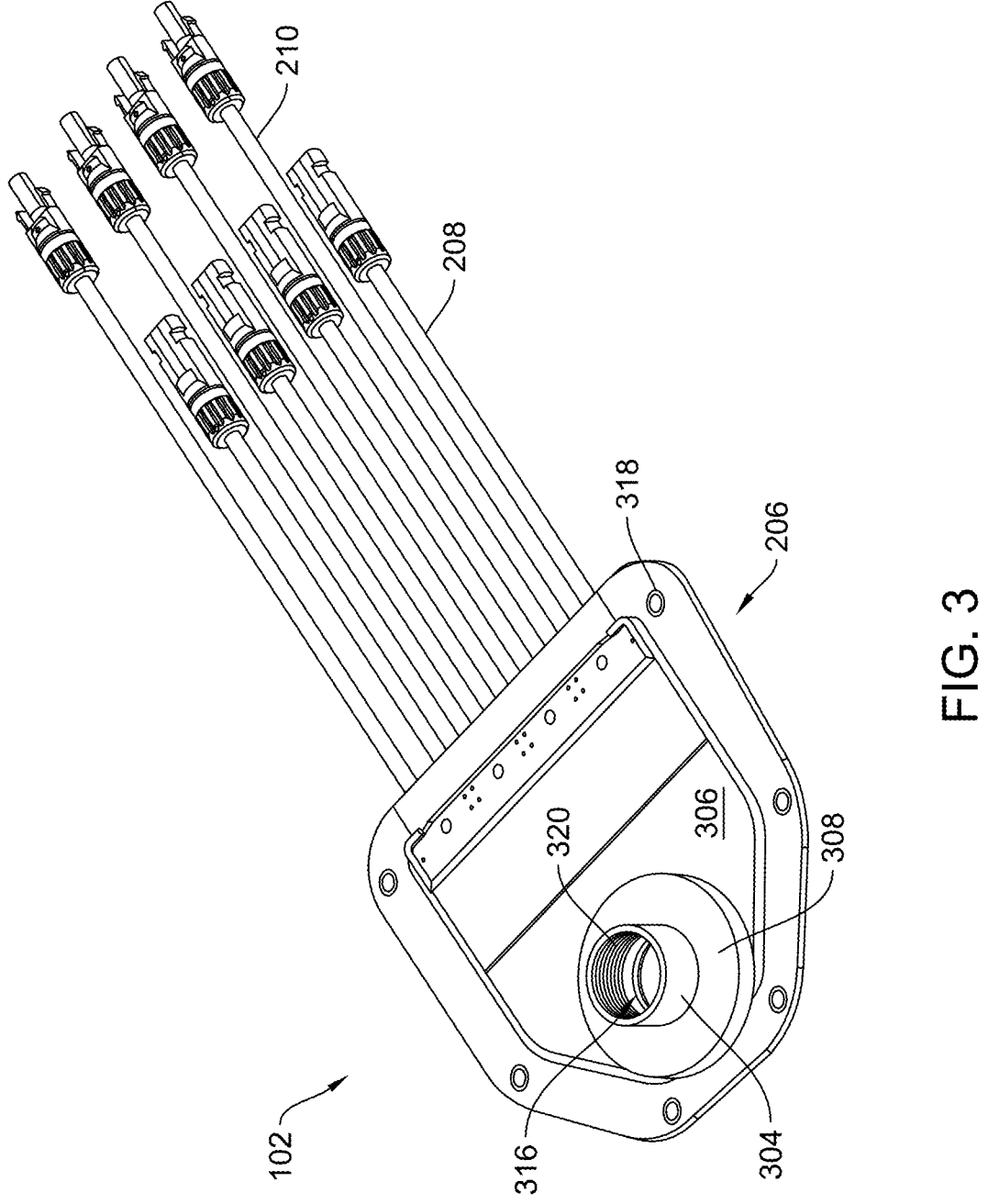
FIG. 3 is a perspective bottom view of an enclosure, according to an embodiment.
Figure 4:
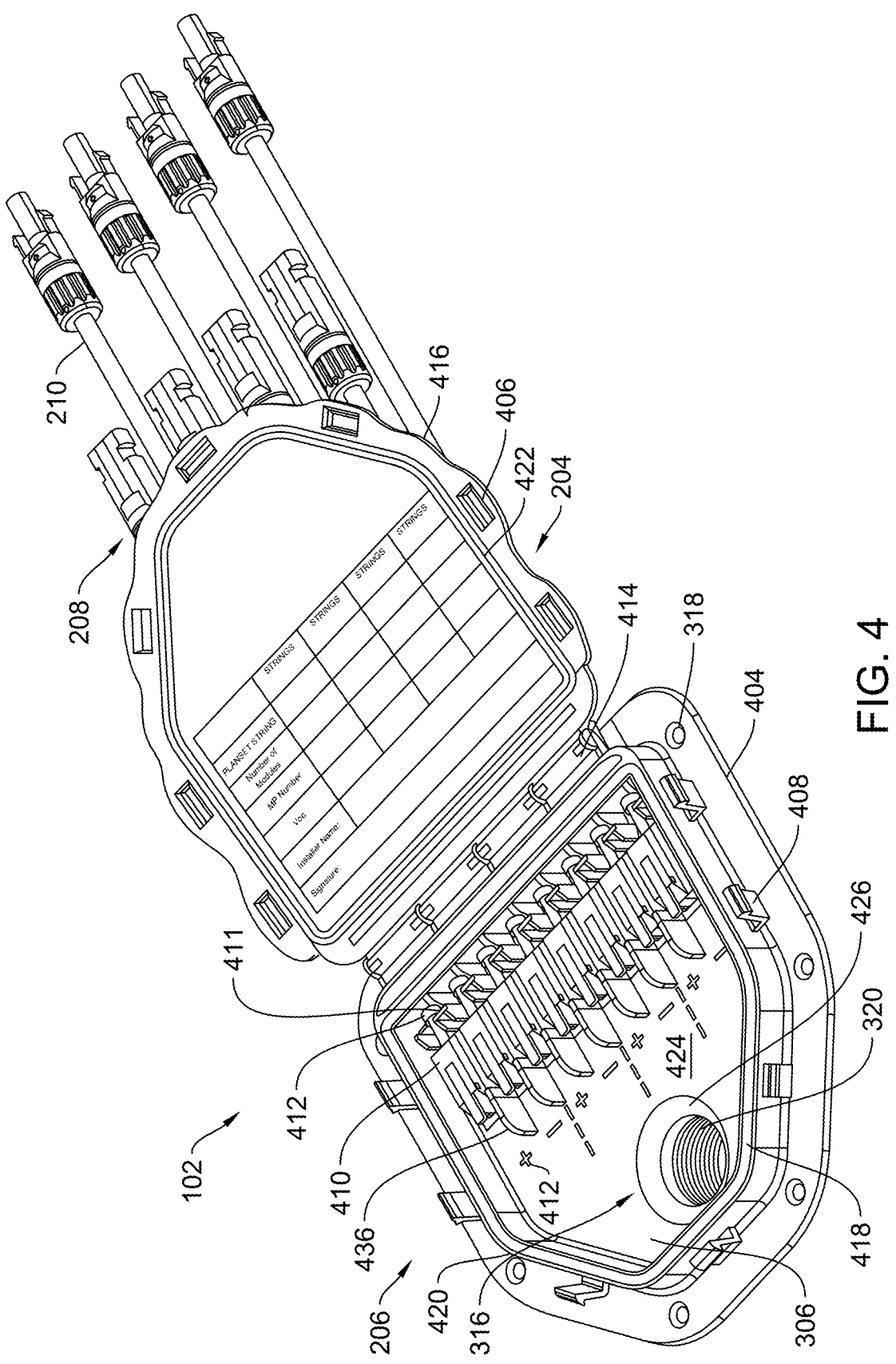
FIG. 4 is a perspective view of an enclosure, according to an embodiment.

The body 206 may define one or more apertures for routing conductors, such as aperture 316 (as shown in FIG. 3) and aperture 412 (as shown in FIG. 4). Referring to FIG. 3, the aperture 316 can be configured to receive an incoming conductor (for example, THWN wire), while the aperture 412 of FIG. 4 can be configured to route the extension conductor 208 to an exterior of the housing.

FIG. 3 illustrates a perspective bottom view of the enclosure 102, according to an embodiment. As shown in FIG. 3, the body 206 may include a drop-down 304. The drop-down 304 is configured to extend below a base surface 306 of the body 206. When mounted to a support surface, such as a roof, the drop-down 304 extends through an opening in the roof so as to allow electrical conductors electrically coupled to the enclosure 102 to extend into an area (e.g., an attic, cave, raceway, etc.) below the roof. In such a manner, the enclosure 102 penetrates the roof. The enclosure 102 may include one or more gaskets and/or sealants (shown as scaling member 308) to prevent penetration of water or debris through the roof. The member 308 may be a gasket, sealant, and/or other sealing member to create a weather/waterproof seal between the base surface 306 and the mounting surface (e.g., the roof). In one embodiment, the member 308 is an EPDM foam that surrounds the drop-down 304 and creates a seal between the enclosure 102 and the roof.

The body 206 defines an aperture (shown as aperture 316) through a base surface 306 of the body 206 at the interface between the drop-down 304 and the base surface 306. For example, the base surface 306 may define a circular opening in the base surface 306 of the body 206 that provides access to an interior of the body 206. One or more conductors may be routed through the aperture 316 into the interior of the body 206. In some embodiments, the enclosure 102 does not include a drop-down 304. In such embodiments, the enclosure 102 may include an aperture through a side wall of the enclosure 102, which may allow the enclosure 102 to be mounted to the mounting surface (e.g., the roof) without routing electrical conductors through the roof, thereby reducing penetrations into the mounting surface.

The drop-down 304 may include threads 320. The threads 320 may be integral (e.g., formed into) to the drop-down 304. The threads 320 may be formed into an interior of the drop-down 304 (as shown in FIG. 3) or on an exterior surface of the drop-down 304. The threads 320 may be configured to couple the enclosure 102 to another component of the photovoltaic system 100 of FIG. 1. Exemplary components may include, but are not limited to or by, a mounting flange that may be used to fasten the enclosure 102 to the mounting surface. In some embodiments, the threads 320 are threadedly coupled to a conduit for routing electrical conductors.

The enclosure 102 may, in some embodiments, include one or more mounting apertures, shown as mounting aperture 318. The mounting aperture 318 may be configured to accept fasteners such as screws, bolts, or rivets for securely attaching the enclosure 102 to a structural surface or a separate mounting bracket. In certain embodiments, the mounting aperture 318 can include an integrated metal or plastic insert for added reinforcement. As an alternative, the mounting aperture 318 could be dimensioned or shaped to accommodate specialized fittings or grommets. Additionally or alternatively, the enclosure 102 may be coupled to the mounting surface with adhesives, such as construction adhesive.

Turning to FIG. 4, a perspective view of the enclosure 102 is shown with the lid 204 in an open position relative to the body 206, thus providing access to an interior of the enclosure 102 defined by the body 206 and/or the lid 204. The lid 204 may be coupled to the body 206 by one or more fastening features such as, but not limited to, a coupling member 414 and/or a connector 408. As shown in FIG. 4, the coupling member 414 may be a hinge that hingedly couples the lid 204 to the body 206. In some embodiments, the lid 204 may be removably coupled to the body 206. In being removably coupled, the lid 204 may be completely removed from the body 206, such as by removing a hinge pin.

Additionally or alternatively to the hinged coupling, the enclosure 102 may include a connector 408 on the body 206 to removably couple the body 206 to the lid 204. The connector 408 may extend from a lateral wall of the body 206 and include a ramped feature to engage a connector opening 406 of the lid 204. The lid 204 defines the connector opening 406 which defines an opening in at least a portion of the lid 204 (e.g., an outer lip 416) of the lid 204. The connector 408 may be configured to be inserted into the connector opening 406 and snap into a mechanical coupling that seals the lid 204 to the body 206. The lateral wall 420 may extend orthogonally or at an angle from the base surface 306. The lateral wall 420 may have a sealant 418 (e.g., a gasket, rubber, etc.) on a top surface of the lateral wall 420 that is configured to be positioned proximate to, and form a seal with, the lid 204. In some embodiments, the lid 204 may have an opposing sealant 422 that forms the seal with the sealant 418.

In some embodiments, the connector 408 is configured to be removed from the connector opening 406, thus unsealing the lid 204 from the body 206. The enclosure 102 may include a plurality of connectors similar or distinct from the connector 408 along the lateral walls of the body 206 and/or a land 404 of the body 206. Likewise, the lid 204 may include one or more connector openings similar to the connector opening 406 around the lip of the lid 204.

An interior surface 424 of the base surface 306 may include a counterbore, shown as counterbore 426, around the aperture 316. In embodiments in which the drop-down 304 is a separate part from the body 206 and mechanically coupled to the body 206, the counterbore 426 may be configured to receive or seat a conduit fitting or locking nut, to allow that hardware to sit flush or below the surrounding surface for a secure and unobtrusive fastening. As an alternative, the counterbore 426 could be adapted to accommodate specialty gaskets or seals for enhanced ingress protection. In some embodiments, the counterbore 426 may be configured to provide a smooth surface for the conductors to ingress and egress the body 206, protecting the conductors from sharp edges that may fray and/or otherwise damage the conductors.

The body 206 may include an opening in the lateral wall 420, shown as aperture 412. The aperture 412 may be configured to allow conductors or connectors to pass laterally into or out of the enclosure 102, providing a routing path for both incoming and/or outgoing cables. In one embodiment, the extension conductor 208 may pass through the aperture 412 and connect to internal components or other system elements without requiring significant reconfiguration of the enclosure 102. For example, the extension conductor 208 may pass through the aperture 412 to couple with a pass-through connector (shown as the pass-through connector 410) at the first end of the extension conductor 208. In certain embodiments, the aperture 412 may accommodate a grommet, compression fitting, or other sealing device that ensures a protective interface around the extension conductor 208, thereby providing a weather/waterproof seal into the interior of the body 206 at the aperture 412. In at least one embodiment, the aperture 412 is sized to receive specialized adapters or bulkhead connectors, to facilitate removal/installation of the extension conductor 208 from/to the body 206.

Figure 6:
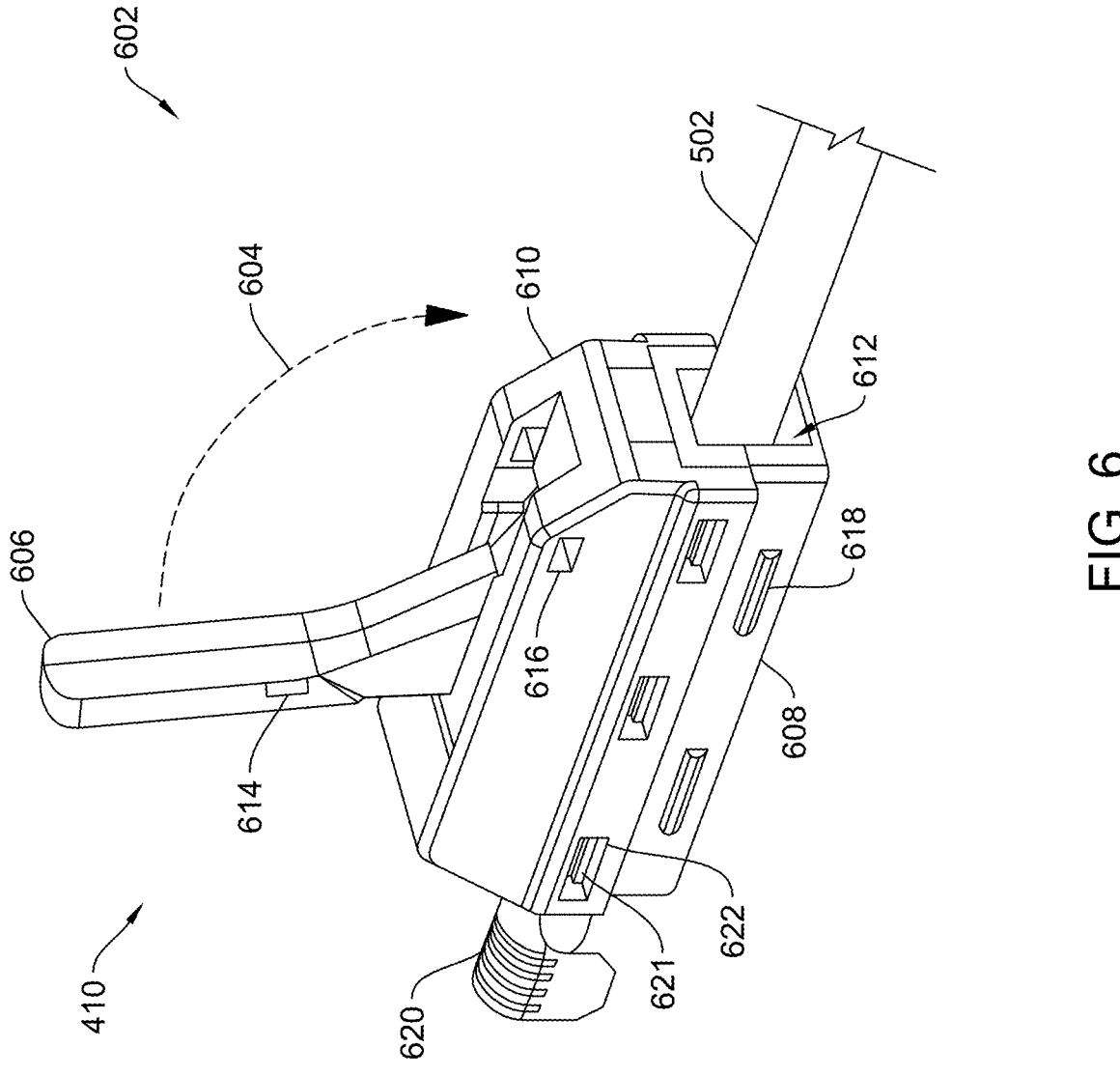
FIG. 6 is a perspective view of a pass-through connector in one of multiple bimodal stable positions, according to an embodiment.
Figure 7:
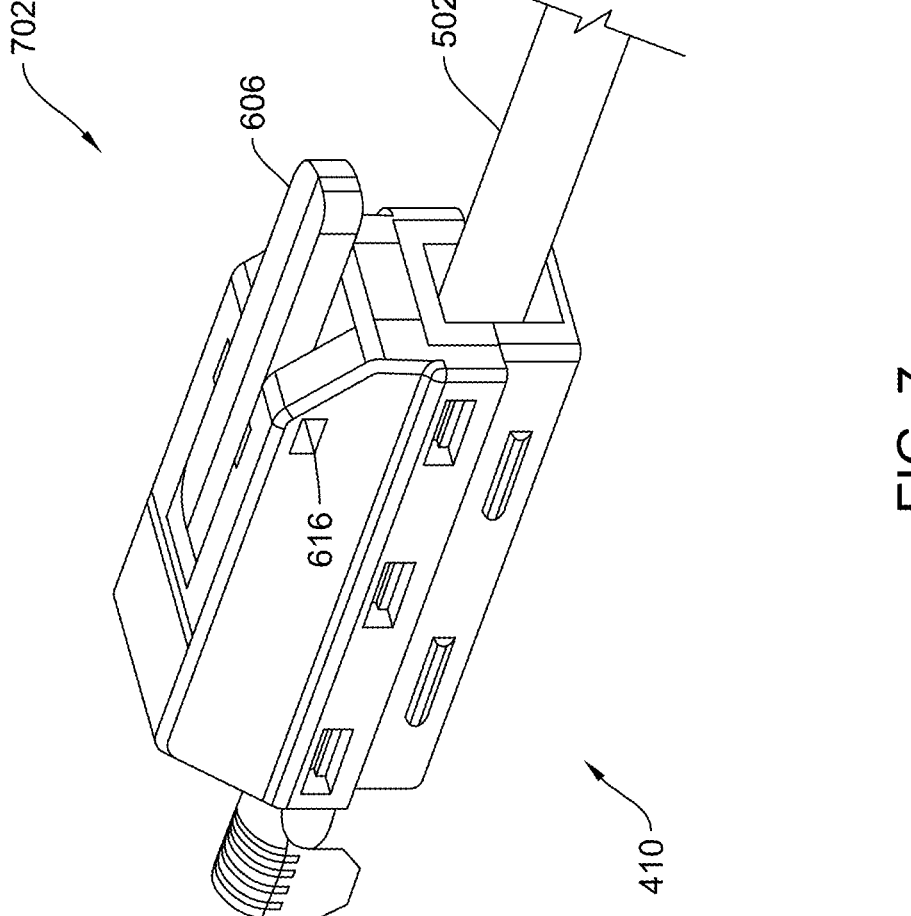
FIG. 7 is a perspective view of a pass-through connector in one of multiple bimodal stable positions, according to an embodiment.
Figure 12:
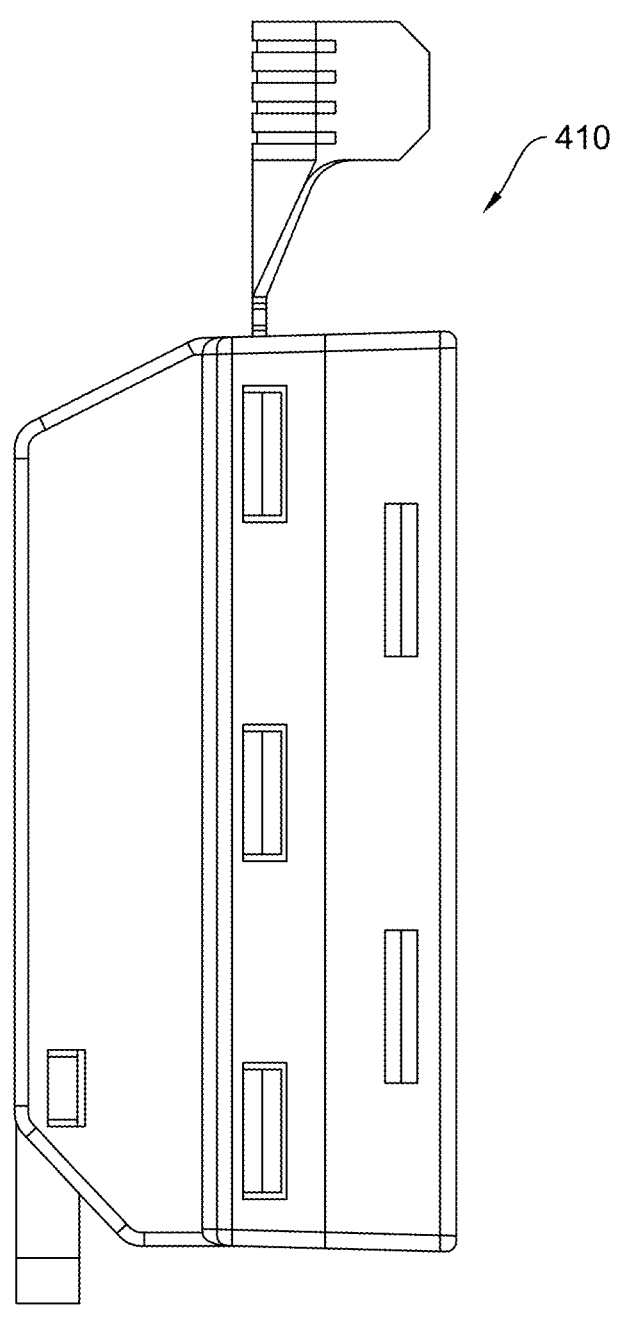
FIG. 12 is a side view of a pass-through connector, according to an embodiment.
Figure 13:
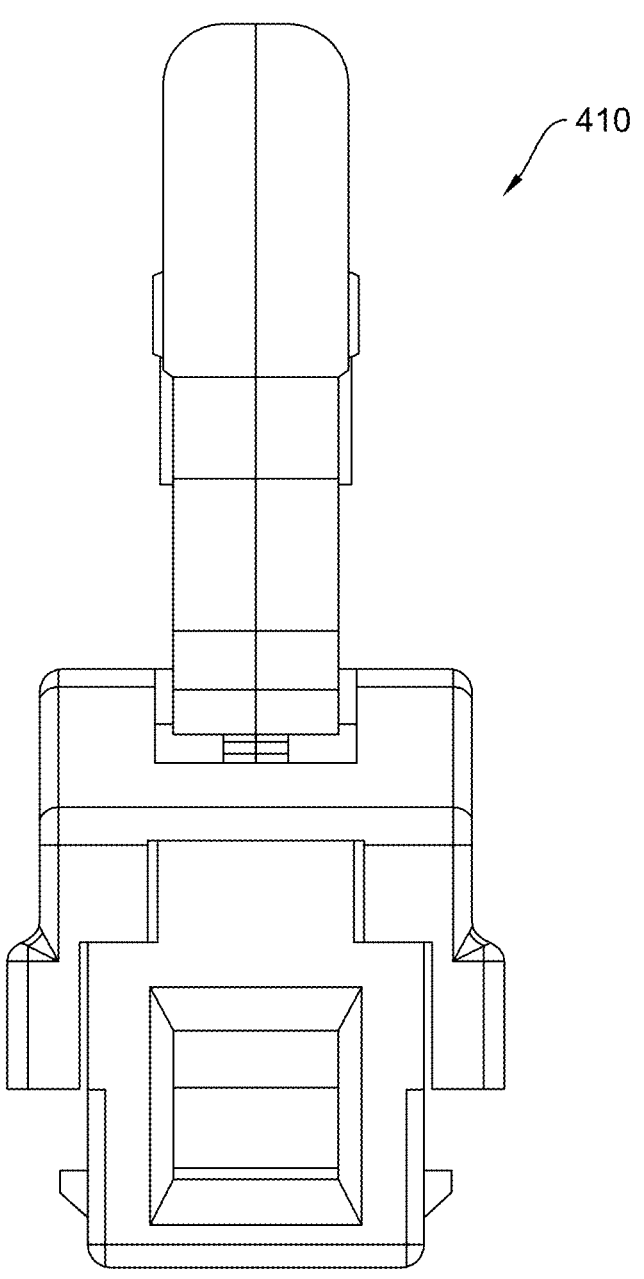
FIG. 13 is a front view of a pass-through connector in the receiving state, according to an embodiment.
Figure 14:
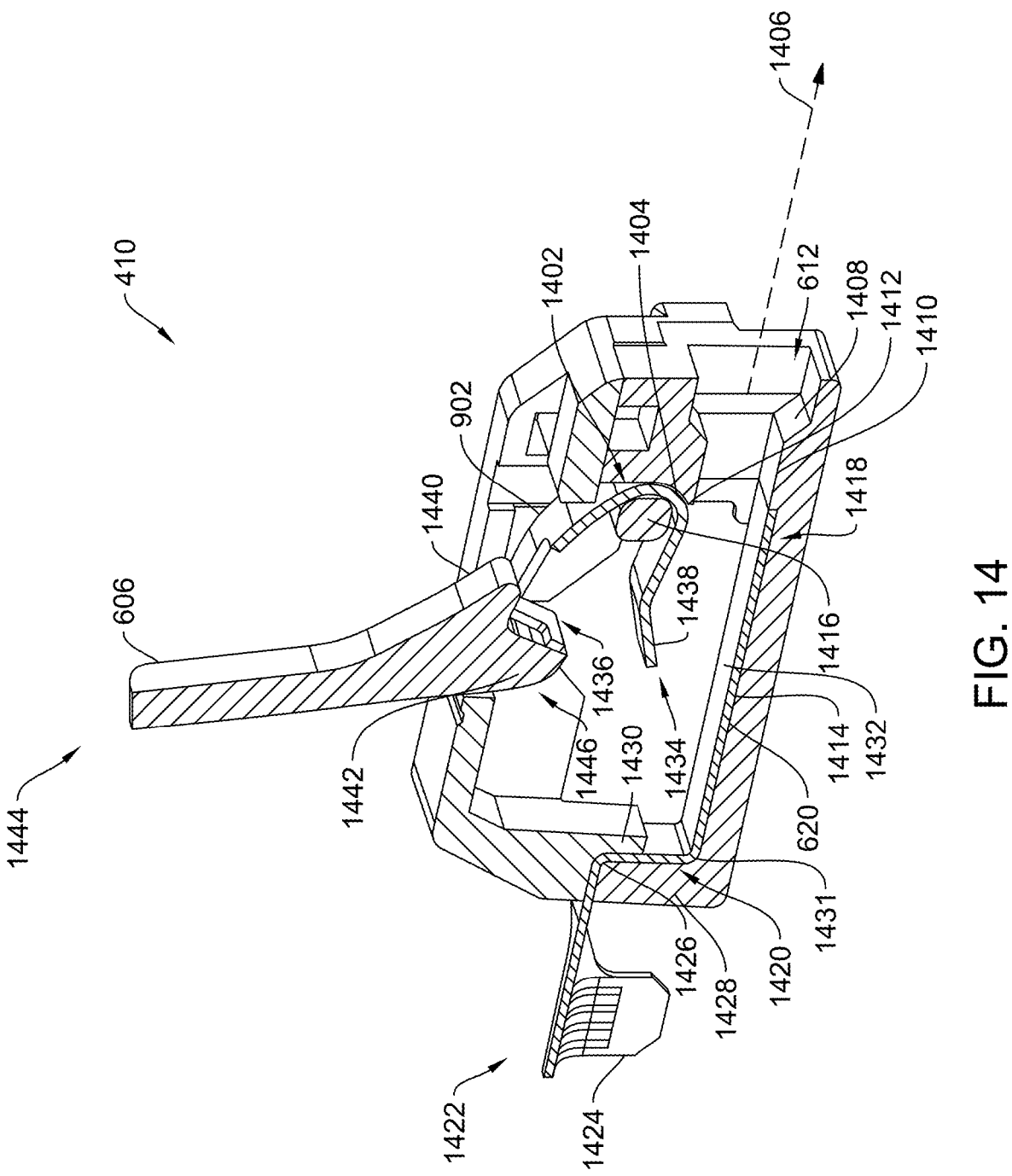
FIG. 14 is a section view of a pass-through connector, according to an embodiment.
Figure 15:
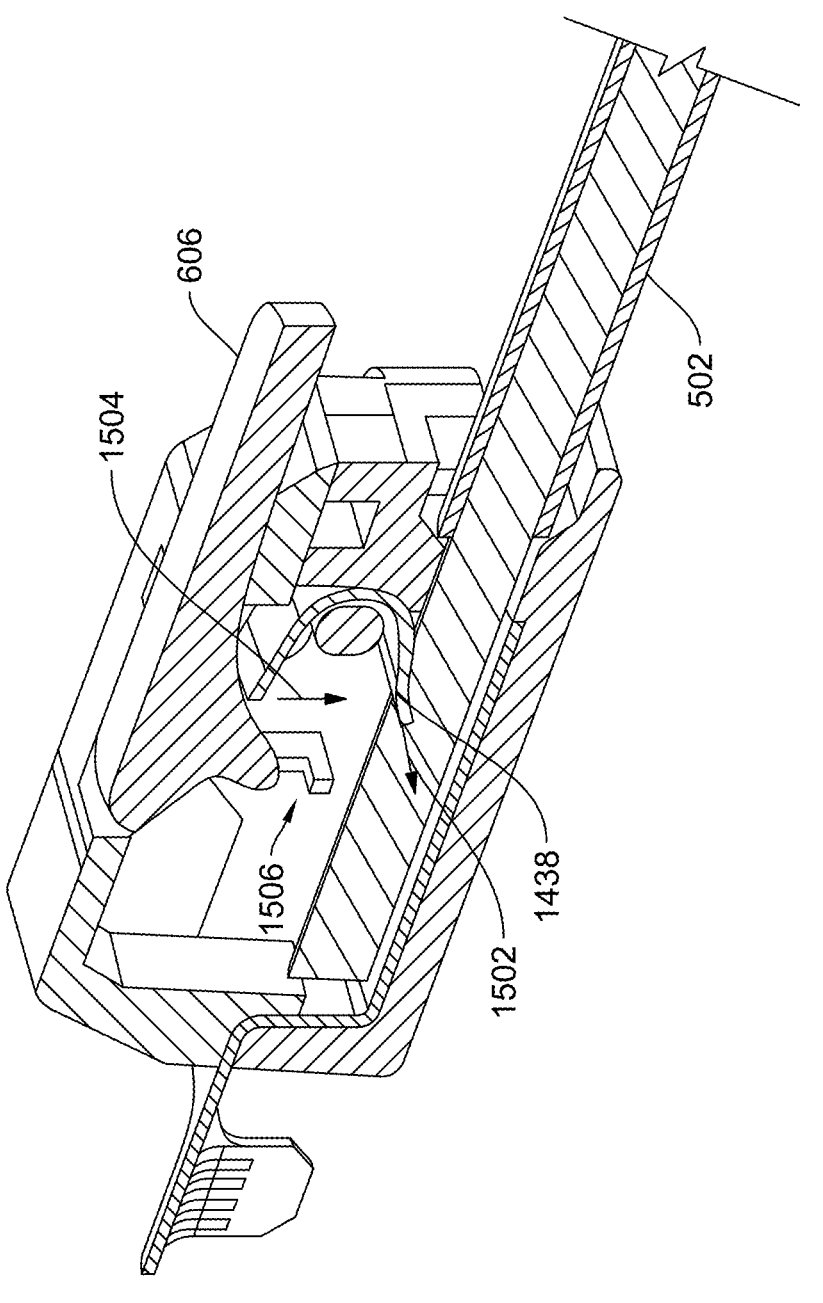
FIG. 15 is a section view of a pass-through connector, according to an embodiment.

As shown in FIG. 4, the enclosure 102 may include (or otherwise be coupled to) an inline conductor, shown as the pass-through connector 410. The enclosure 102 may house one or more pass-through connectors, shown as the pass-through connector 410. Each pass-through connector 410 can be configured to provide a secure and reliable electrically conductive interface for transitioning electrical power from an extension conductor (e.g., the extension conductor 208) to an outgoing conductor (e.g., the conductor 502 of FIG. 5) opposite the extension conductor within a compact footprint. As shown in FIGS. 6-15, and described in greater detail herein, the pass-through connector 410 includes a body, a cap, a contact spring, and an actuator mechanism in a single assembly. This reduces the need for bulky external junctions and simplifies installation of the enclosure 102. The pass-through connector 410 may have a height of less than 22 millimeters. An interior channel formed by the body and cap accommodates the contact spring which may be actuated by the actuator to apply a force against an inserted conductor (e.g., the conductor 502), which facilitates both electrical continuity and mechanical retention. The configuration of the actuator in conjunction with the contact spring provides for a system with bimodal stability. In other words, the actuator may have two configurations in which it is stable (e.g., bimodal stability). The first stable configuration may be a receiving state (e.g., the contact spring is not engaged, as shown in FIGS. 6 and 14). The second stable configuration may be a holding state (e.g., the contact spring is engaged, as shown in FIGS. 7 and 15).

The pass-through connector 410, with its actuated contact spring, facilitates adaptability to various wire gauges (e.g., 10, 12, 14, 16, 18, 20, 22 AWG) and/or connection types (e.g., stranded, solid, etc.). Moreover, the body and cap can be formed from materials suited for outdoor use, such as UV-stabilized polymers or corrosion-resistant alloys.

The enclosure 102 may include one or more partitions, shown as partition 436, 411. The partition 436 is configured to physically separate and organize conductors within the enclosure 102, ensuring that wires remain routed and properly isolated from one another. The partition 436 extends from the interior surface 424 and is positioned between pass-through connectors (e.g., the pass-through connector 410). In certain embodiments, the partition 436 may be integrally molded with the enclosure housing or removably attached using fasteners, thereby facilitating reconfiguration or adaptation of the interior layout based on varying conductor types or system requirements. As an alternative, the partition 436 could incorporate labeling, channels, and/or guides.

FIG. 5 is a perspective top view of the interior of the body 206 with a plurality of conductors (shown as conductor 502) entering the interior of the body 206 through the aperture 316. The conductor 502 is routed to the pass-through connector 410 and shown inserted therein.

FIG. 6 is a perspective view of the pass-through connector 410 in one of the bimodal stable positions (e.g., the receiving state). The pass-through connector 410 may include a body 608, a terminal 620, an actuator 606, a cap 610, and/or a contact spring (shown as contact spring 902 in FIG. 9).

Figure 9:
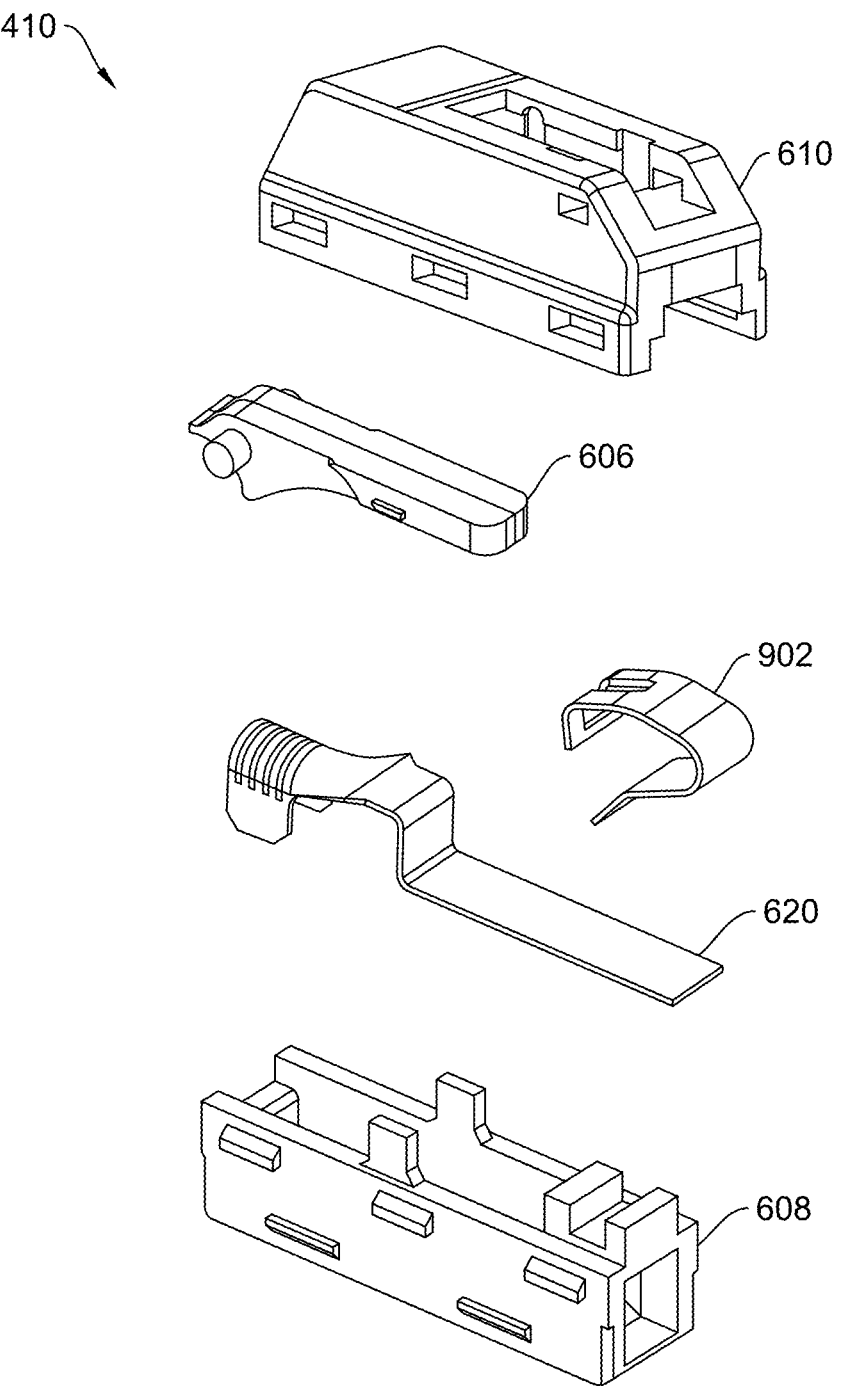
FIG. 9 is an assembly view of a pass-through connector, according to an embodiment.

The body 608 is configured to a provide structural framework of the pass-through connector 410, defining at least a portion of an interior of the pass-through connector 410. The interior of the pass-through connector 410 may include a channel (e.g., a channel 1402 as shown FIG. 14) for a contact spring (e.g., a contact spring 902, as shown in FIGS. 9 and 14), thereby facilitating proper alignment of the contact spring with a cap and actuator. With features such as protrusions, recesses, or reinforcement ribs (as described herein), the body 608 supports a mechanical engagement with one or more conductors.

In some embodiments, the body 608 is molded or cast from materials such as glass-filled nylon and/or another polymer with high temperature and UV resistance. The body 608 may also include one or more protrusions or recesses to align with a cap or actuator, ensuring proper assembly. Additionally or alternatively, the body 608 is formed with integral reinforcement ribs (either on the interior or exterior of the body 608) to enhance rigidity and withstand repeated actuator cycles.

The body 608 may include an opening 612. This opening 612 is configured to provide an aperture through which a conductor (e.g., the conductor 502 of FIG. 5) may enter into the interior of the pass-through connector 410. The opening 612 may be of any suitable shape including, but not limited to, circle, square, rectangle, or any other polygon. As shown in FIG. 14, the opening 612 may include a ramped section 1408. The ramped section 1408 may extend around one or more sides of the opening 612. As shown in FIG. 14, the ramped section 1408 may be inset from the opening 612. The ramped section 1408 may be configured to facilitate insertion of the conductor 502 into the interior of the pass-through connector 410. The ramped section 1408 may reduce the size of the opening 612 into the interior of the pass-through connector 410 to provide a more secure holding of the conductor 502 in the holding state, such as shown in FIG. 7. As shown in FIG. 14, the body 608 may have an axis 1406 extending through the center of the opening 612. The conductor 502 may be inserted into the interior of the body 608 along the axis 1406.

The body 608 may include an interior curved edge 1404, as shown in FIG. 14. The interior curved edge 1404 may be configured to define at least a portion of a channel 1402 through which the contact spring 902 extends during operation. The interior curved edge 1404 may define a portion of the interior surface of the body 608 and extend into the interior of the pass-through connector 410. The interior curved edge may curve into the interior of the pass-through connector 410, curving away from the opening 612 toward an apex 1412. The apex 1412 extends into the interior of the pass-through connector 410 away from the opening 612.

The interior curved edge 1404 cooperates with a pivot pin (e.g., a pivot pin 1416, as described further herein) to define the channel 1402 that houses the contact spring 902. The channel 1402 has a curvature defined by a surface of the pivot pin 1416 and the interior curved edge 1404 which facilitates positioning of the contact spring 902 during a holding state to provide a retention force or compression angle.

The pass-through connector 410 may include a raised stop 1410. The raised stop 1410 may be configured as a stop against which the terminal 620 is abutted. The raised stop 1410 provides a positive stop to which the terminal 620 may be positioned for alignment during assembly and operation. The raised stop 1410 protrudes from the interior surface of the body 608. In some embodiments, the ramped section 1408 extends to the raised stop 1410, as shown in FIG. 14. The raised stop 1410 may be raised from a surface 1414. The surface 1414 provides a surface upon which a contact region 1418 of the terminal is positioned against.

The pass-through connector 410 may include the terminal 620. The terminal 620 may be configured to provide an electrical coupling between two or more electrical conductors, such as, but not limited to, the conductor 502 and the extension conductor 208. The terminal 620 may be manufactured from one or more electrically conductive materials (e.g., copper, copper-alloy, aluminum, nickel-plated steel, or silver-plated brass). The terminal 620 may comprise a contact region 1418, a locating region 1420, and/or a fastening region 1422, arranged so that the fastening region 1422 remains exterior to the interior defined by the body 608 and the contact region 1418 is positioned within the interior so that it can interface with an inserted conductor, such as the conductor 502. In some embodiments, the fastening region 1422 is opposite the contact region 1418 of the terminal 620. In some embodiments, the fastening region 1422 includes one or more wings, such as wing 1424 for crimping or otherwise coupling to an electrical conductor (e.g., the first end of the extension conductor 208). In some embodiments, the fastening region 1422 from the pass-through connector 410 opposite the opening 612.

The fastening region 1422 may be substantially located along a first plane, the locating region 1420 may extend from the fastening region at a bend 1426 with an angle (e.g., 45°, 90°, 135°). The locating region 1420 may be positioned between a surface (e.g., an interior surface or exterior surface) of a wall 1428 of the body 608 and a surface of a wall 1430 of the cap 610. In this way, the locating region 1420 of the terminal 620 is constrained in position between the cap 610 and the body 608, thereby holding the terminal 620 securely in place. The contact region 1418 extends from the locating region 1420 at a bend 1431. In other words, the locating region 1420 may extend between the bend 1426 and the bend 1431

The terminal 620 may be in contact with the interior surface of the body 608 along at least a portion of the locating region 1420 (including the bend 1431 and/or the bend 1426) and/or the contact region 1418. The contact region 1418 may be in contact with the surface 1414, and the contact region 1418 may have a thickness such that the raised stop 1410 and the contact surface 1432 of the contact region 1418 are coplanar, thereby facilitating insertion of the conductor 502 into the pass-through connector 410 and providing a secure contact area for an unsheathed portion of the conductor 502 with the contact spring 902. The contact surface 1432 is made of a conductive material so that the unsheathed portion of the conductor 502 may be electrically coupled to the contact region 1418.

The extension conductor 208 may have an electrically conductive core that is coupled to the fastening region 1422 of the terminal 620. For example, the extension conductor 208 may be stripped of its insulation at the second end and positioned proximate (e.g., in contact with) the fastening region 1422 of the terminal 620. In a crimping approach, the fastening region 1422 can include a cylindrical barrel or similarly shaped section (e.g., having one or more wings, such as the wing 1424) which is mechanically deformed (e.g., via compression tools or automated crimping equipment) to tightly envelop and hold the bare conductor core of the extension conductor 208. In some embodiments, such as shown in the figures, the terminal 620 includes two wings which may be deformed in a crimping fashion around the conductive core of the extension conductor 208 to electrically and physically couple the extension conductor 208 proximate to the terminal 620. Though the wing 1424 is shown in FIG. 14, it is understood that the fastening region 1422 may have one or more members of shapes, and/or techniques other than a wing to securely fasten the extension conductor 208 proximate to the terminal 620. For example, the fastening region 1422 may integrate different coupling methods such as a set screw, clamp, solder joint, or ultrasonic weld to mechanically and electrically couple the extension conductor 208 proximate to the fastening region 1422.

As shown in FIG. 4, the extension conductor 208 extends from the fastening region 1422, through the aperture 412, to an exterior of the enclosure 102. In some embodiments, the extension conductor 208 is coupled to the pass-through connector 410 prior to installation of the pass-through connector 410 to the body 206 of the enclosure 102. For example, the extension conductor 208 may be coupled to the pass-through connector 410 prior to coupling the pass-through connector 410 to the body 206, such as by a snap fit, fastening, or other coupling technique.

The body 608 of the pass-through connector 410 may have one or more protrusions extending from the walls of the body 608 for physically coupling the body 608 to one or more components. For example, as shown in FIG. 6, the body 608 may include one or more housing protrusions, shown as housing protrusion 618, that are configured to protrude into, and physically engage with, one or more recesses in the enclosure 102, such as a mounting recess. The housing protrusion 618 may be formed as a molded projection extending from the body 608 with a size and shape to physically align with the corresponding mounting recess in the body 206. In assembly, the housing protrusion 618 is positioned over the mounting recess and pressed into place, causing the outer edges of the housing protrusion 618 to flex slightly as they pass the mounting recess lip. Once fully inserted, the housing protrusion 618 snaps back to its original form from the flexed position, engaging with the mounting recess, and physically coupling the body 608 securely to the body 206. In such manner, the physical engagement of the housing protrusion 618 in the mounting recess facilitates a removable fastening of the body 608 to the body 206.

The body 608 may include a cap protrusion 621 for physically engaging the cap 610 through one or more cap recesses, such as the cap recess 622. The cap protrusion 621 may be an integrally molded extension of the body 608 and configured to provide a mechanical connection between the body 608 and the cap 610. The cap protrusion 621 may have a tapered or hook-like profile that allows it to flex slightly when inserted into the cap recess 622 in the cap 610. As the cap protrusion 621 is pressed into place to physically engage with the cap recess 622, its outer edges may temporarily deform to pass over the lip of the cap recess 622, after which they return to their original shape, thereby physically engaging the cap 610 and coupling the body 608. This snap-fit engagement allows the cap 610 to remain securely fastened to the body 608 while allowing for disassembly. In some embodiments, the cap protrusion 621 may include additional retention features, such as barbs or interlocking ridges, to enhance mechanical stability and prevent unintentionally disengaging from the cap recess 622. In such manner, the physical engagement of the cap protrusion 621 in the cap recess facilitates a removable fastening of the body 608 to the cap 610.

The cap 610 may form part of the pass-through connector 410 and define, in part, the interior of the pass-through connector 410. The cap 610 may be coupled to the body 608 to form the partially enclosed interior of the pass-through connector 410. The cap 610 can be configured to provide a stable pivot point—such as with a pivot pin 1416—and to secure the contact spring 902 and other internal elements. In some implementations, the pivot pin 1416 of the cap 610 defines, in part, a recess or channel with the interior curved edge 1404 of the body 608 for the contact spring 902 to be located in operation. The cap 610 may be fastened to the body 608 via snap-fit features, a hinge mechanism, or threaded inserts, allowing the cap 610 to be removed or replaced during maintenance. In some embodiments, the cap 610 may have a transparent or windowed section for visual inspection of the conductor 502 when the conductor 502 is coupled to the pass-through connector 410.

The cap 610 may include the pivot pin, shown as pivot pin 1416 in FIG. 14. The pivot pin 1416 may extend from a first lateral wall to a second lateral wall, forming a boundary of the channel 1402 (the other boundary formed, at least in part, by the interior curved edge 1404) of the body 608. The pivot pin 1416 is configured to pivotally constrain the contact spring 902 within the pass-through connector 410 and support rotational movement of the contact spring 902 (e.g., act as a fulcrum for the contact spring 902) which facilitates the application of a force (e.g., force 1502) by the contact spring 902 on the conductor 502 (e.g., as shown in FIGS. 7 and 15). The pivot pin 1416 helps maintain the position of the contact spring 902 when the actuator 606 applies a force (e.g., force 1504 of FIG. 15) on the contact spring 902. The opening 612 helps maintain the position of the contact spring 902 when the actuator disengages the contact spring 902.

The pass-through connector 410 may include a contact spring 902. The contact spring 902 may be positioned partly within the channel defined by the body 608 and pivot pin 1416, biasing itself against a conductor when the actuator is in a holding position. This biasing action provides high pull-out resistance to keep the conductor secure. The contact spring 902 could be formed from stainless steel or another corrosion-resistant metal to preserve conductivity and mechanical performance. As an alternative, the contact spring 902 may have additional bends or prongs to enhance its grip on the conductor, or it could be surface-treated to reduce friction and wear.

The contact spring 902 may be made of a resilient metal alloy or other compliant mechanism. As shown in FIG. 14, the contact spring 902 may have a first end 1434 and a second end 1436 opposite the first end 1434. The contact spring 902 may have a prong 1438 at the first end 1434. The prong 1438 of the contact spring 902 may be an extended portion of the spring configured to engage an inserted conductor (e.g., the conductor 502) and maintain electrical contact with the conductor. As shown in FIG. 15, the contact spring 902 may be positioned within the channel formed by the body 608 and cap 610, such that when the conductor 502 is inserted into the pass-through connector 410, the prong 1438 applies a biasing force (e.g., the force 1502) against the conductor 502. In some embodiments, and as shown in FIG. 15, the prong 1438 physically engages with the conductor 502 when the actuator 606 is in a holding position (as described herein). The force 1502 may be generated by the natural elasticity of the contact spring 902, which allows the prong 1438 to apply the force 1502 when engaged by the actuator 606 and pressing against a surface, thereby gripping the conductor 502 securely. The force 1502 may be generated by the contact spring 902 being resiliently deformed between the actuator 606 at the second end 1436 and the conductor 502 at the first end 1434. The actuator 606 may apply a force 1504, when in the holding state, to the second end 1436 of the contact spring 902.

In some embodiments, the prong 1438 may include serrated edges, ridges, or a textured surface to enhance its gripping ability and improve conductivity by increasing the contact area with the conductor. As an alternative, the prong 1438 could be designed with a curved or angled profile to increase insertion forces and provide a self-aligning feature. The prong 1438 may be made of a material with high conductivity and mechanical resilience, such as stainless steel, phosphor bronze, or a copper alloy with a corrosion-resistant coating.

The pass-through connector 410 may include the actuator 606. The actuator 606 may be a lever-like component that pivots or slides within or about the enclosure 102 to move between a receiving position (e.g., shown as receiving position 602 in FIG. 6) and a holding position (e.g., shown as holding position 702 of FIG. 7). The actuator 606 may include one or more protrusions, such as protrusion 614, extending from an outer surface of the actuator 606. The protrusion 614 of the actuator 606 is configured to engage a recess 616 in the cap 610 when the actuator 606 is moved into the holding position 702. In this position, the protrusion 614 snaps or locks into the recess 616 (e.g., as described herein), preventing unwanted disengagement. When moving the actuator 606 back toward the receiving position, the protrusion 614 disengages from the recess 616, allowing the actuator 606 to pivot or slide along a path 604, thus disengaging the contact spring 902 and removing or reducing a force applied to the contact spring 902 (e.g., shown as force 1504 in FIG. 15), thereby releasing the contact spring 902 and providing clearance for inserting or removing a conductor.

The actuator 606 includes a first end 1444 and a second end 1446 opposite the first end 1444. The second end 1446 may be forked. The fork at the second end of the actuator 606 is formed by two prongs that extend away from the main actuator body, creating a generally U- or Y-shaped fork profile. As shown in FIGS. 14-15, the first prong of the fork comprises a fulcrum 1440, and the second prong of the fork comprises a spring stop 1442 opposite the fulcrum 1440. The fulcrum 1440 is shaped to provide a bearing surface against the contact spring 902, enabling a pivoting action that exerts a controlled force on the conductor when the actuator 606 is in the holding position 702. In the holding position 702, the fulcrum 1440 bears against the contact spring 902, pressing it toward the conductor and applying the force 1504 (as shown in FIG. 15) on the contact spring 902 so as to maintain a high pull-out force for the conductor in the holding position 702. In some embodiments, the pull-out force may exceed 300 Newtons. In some embodiments, the fulcrum 1440 may have a slightly rounded or contoured edge, which reduces friction with the contact spring 902 and enhances the smoothness of the actuator's transition between receiving and holding positions.

When in the receiving position 602, the spring stop 1442 retains the second end 1436 of the contact spring 902 in alignment, thus preventing undesired lateral or rotational displacement of the contact spring 902. Together, these forks guide and limit the movement of the contact spring 902. The actuator 606 travels along a path 604 between the receiving position 602—where the contact spring is disengaged and the conductor can be inserted or removed with minimal force—and the holding position 702—where the conductor 502 is secured to the contact region 1418 of the terminal 620 under compression from the contact spring 902, thereby maintaining electrical continuity while retaining the conductor 502 within the pass-through connector 410.

The spring stop 1442 is spaced from the fulcrum 1440 and may be oriented at an angle or offset to capture and restrain the second end 1436 of the contact spring 902 when in the receiving position 602. This prevents the contact spring 902 from flexing laterally or shifting out of alignment. The geometry of the fork—in particular, the gap, angle, and length of each prong—is selected to accommodate the thickness of the contact spring 902 and to provide reliable engagement with the conductor without requiring excessive insertion or removal forces.

The actuator 606 is configured to have a bimodal stability, in which the actuator 606 may be in a first stable position (e.g., the receiving position 602) or a second stable position (e.g., the holding position 702) without requiring continuous external force. In the receiving position 602, the actuator 606 is oriented so that there is minimal pressure on the contact spring 902, thus disengaging the contact spring 902 and allowing an installer to insert or remove a conductor (e.g., the conductor 502). In the holding position 702, the actuator 606 moves to depress the contact spring 902 toward the contact region 1418 of the terminal 620 and press against the inserted conductor (e.g., the conductor 502), thereby engaging the conductor 502 and maintaining a high pull-out force and reliable electrical contact.

The bimodal stability arises from the configuration of the forked nature of the second end 1446 of the actuator 606. For example, the prongs of the second end 1446 (e.g., the fulcrum 1440 and/or the spring stop 1442) may act as one or more cam surfaces that, when pressing against the contact spring 902, effectively lock the actuator 606 into either of the stable positions. The actuator 606 may rotate (e.g., following the path 604) such that the fulcrum 1440 cams the contact spring 902 into a locked stable position. In the receiving position 602, the contact spring 902 presses against the spring stop 1442 and/or the fulcrum 1440 to lock the actuator 606 into a stable position. In some embodiments, the fulcrum 1440 and the spring stop 1442 form an angled notch, into which the second end 1436 of the actuator 606 is positioned in the receiving position 602. As shown in FIG. 15, when the actuator is rotated to the holding position 702, the contact spring 902 presses against the fulcrum 1440. In some embodiments, the contact spring 902 has an opening 1506 in the second end 1436. The bimodal stability of the actuator 606 facilitates installation of the conductor 502 into the pass-through connector 410. For example, when the pass-through connector 410 is the receiving position 602, the installer is able to insert the conductor 502 one-handedly. Once inserted, the user may then actuate the actuator 606 to the holding position 702 with one hand, thereby locking the conductor 502 into place.

Figure 8:
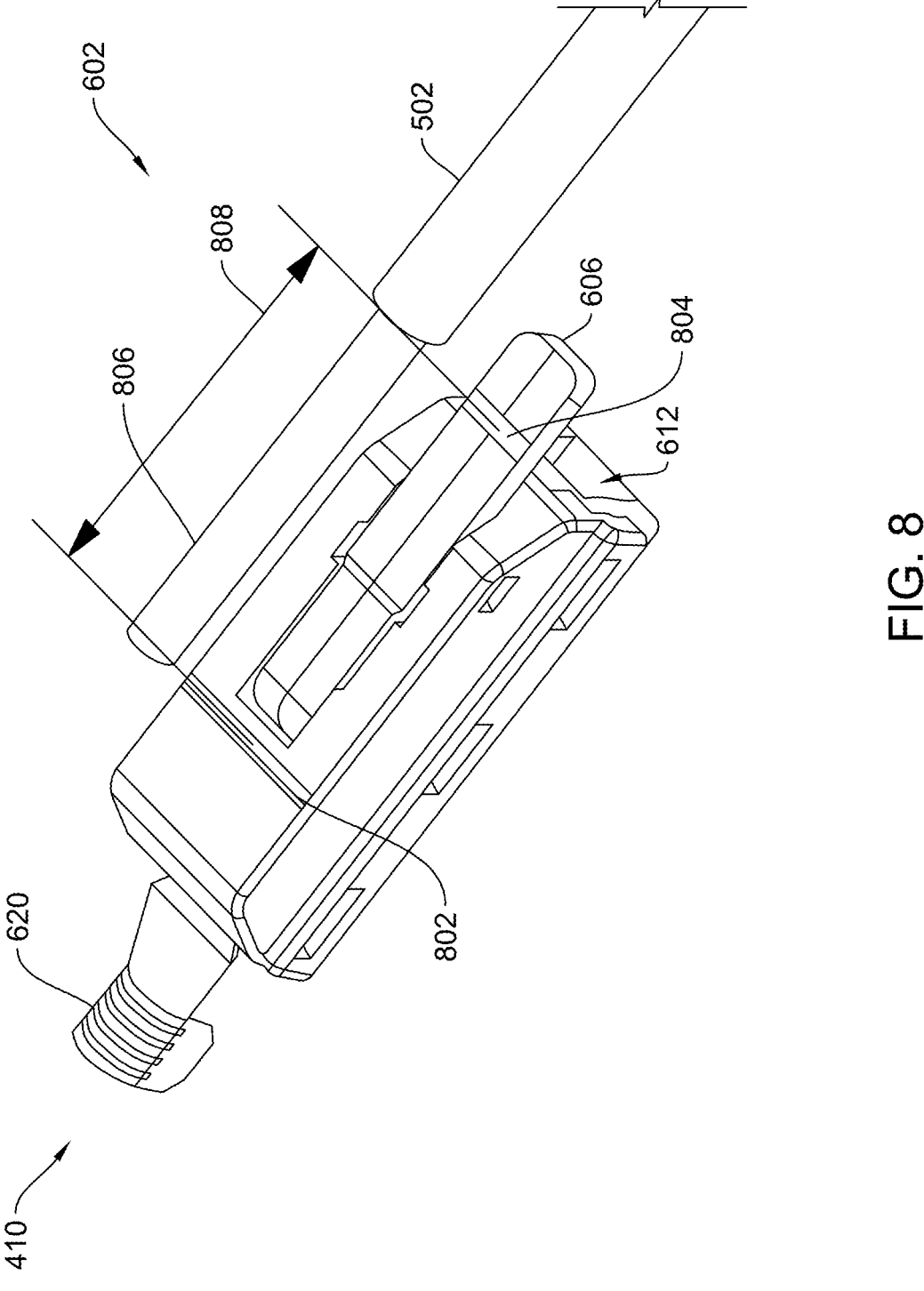
FIG. 8 is a perspective view of a pass-through connector in one of multiple bimodal stable positions, according to an embodiment.

In addition to bimodal stability, the actuator 606 and/or the cap 610 may include one or more markings to indicate a distance 808 of conductor to unsheathe prior to insertion into the opening 612 of the pass-through connector 410. For example, as shown in FIG. 8, the cap 610 may include a first indicator 802 and a second indicator 804. The distance 808 between these indicators may be 20-25 millimeters. In some embodiments, the distance is 22 millimeters. The pass-through connector 410 may be configured to receive 22 millimeters of the conductor 502 that is unsheathed into the pass-through connector 410. As such, the installer may easily verify (e.g., visually) that an unsheathed portion 806 of the conductor 502 is substantially close to the distance 808 by positioning the unsheathed portion 806 proximate to the first indicator 802 and the second indicator 804.

Figure 10:
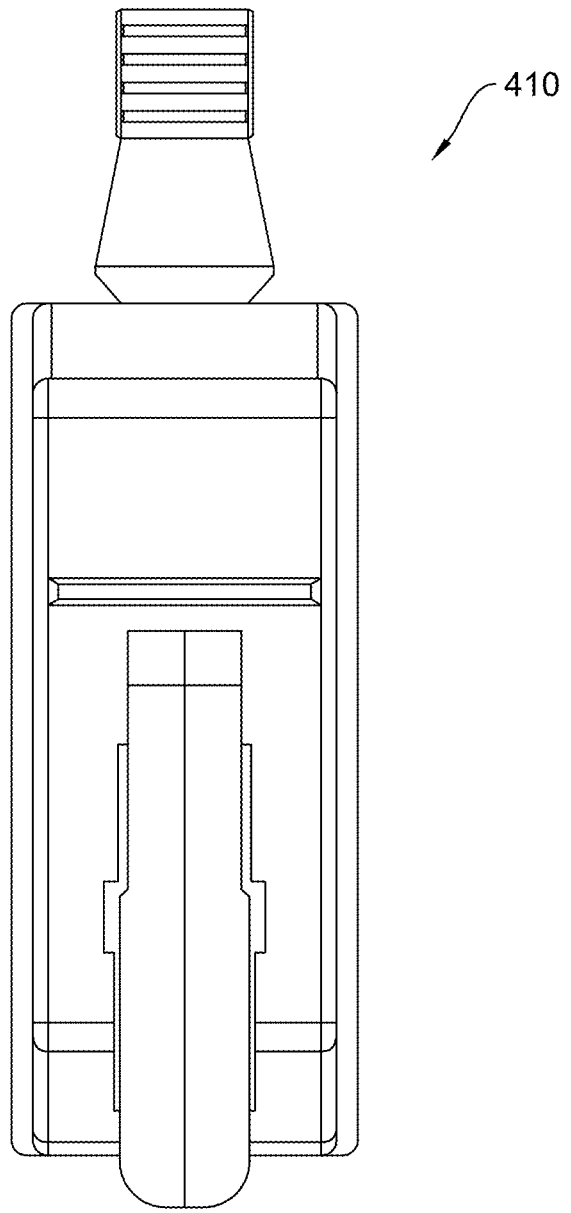
FIG. 10 is a top view of a pass-through connector, according to an embodiment.
Figure 11:
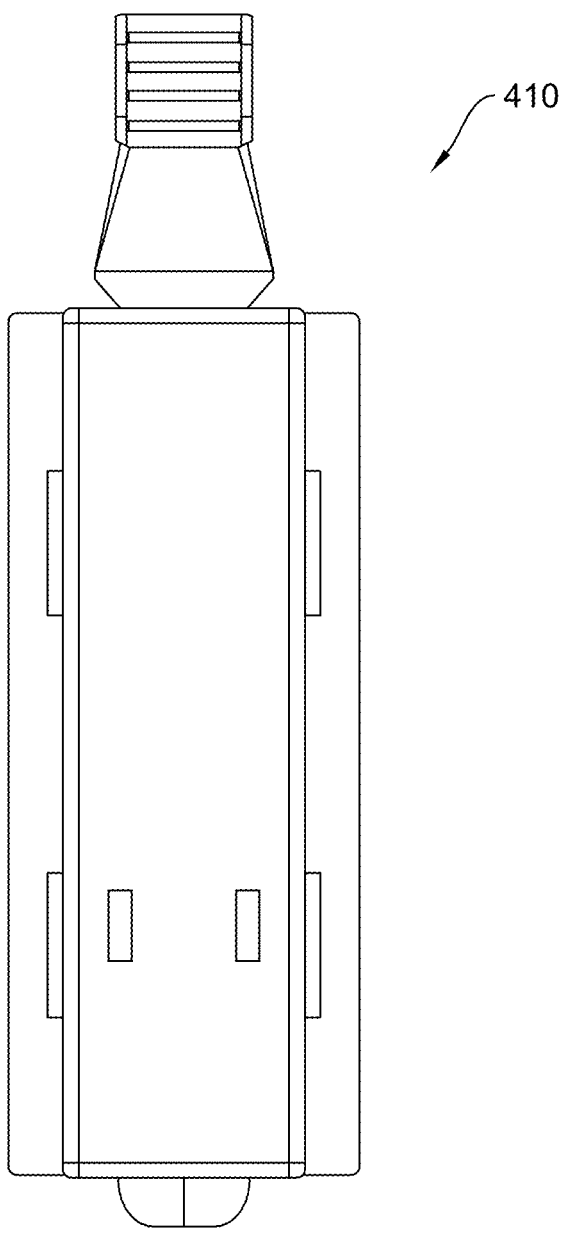
FIG. 11 is a bottom view of a pass-through connector, according to an embodiment.

FIG. 9 is an assembly view of the pass-through connector 410, according to an embodiment. FIG. 10 is a top view of the pass-through connector 410, according to an embodiment. FIG. 11 is a bottom view of the pass-through connector 410, according to an embodiment. FIG. 12 is a side view of the pass-through connector 410, according to an embodiment. FIG. 13 is a front view of the pass-through connector 410 in the receiving state, according to an embodiment.

Figure 16:
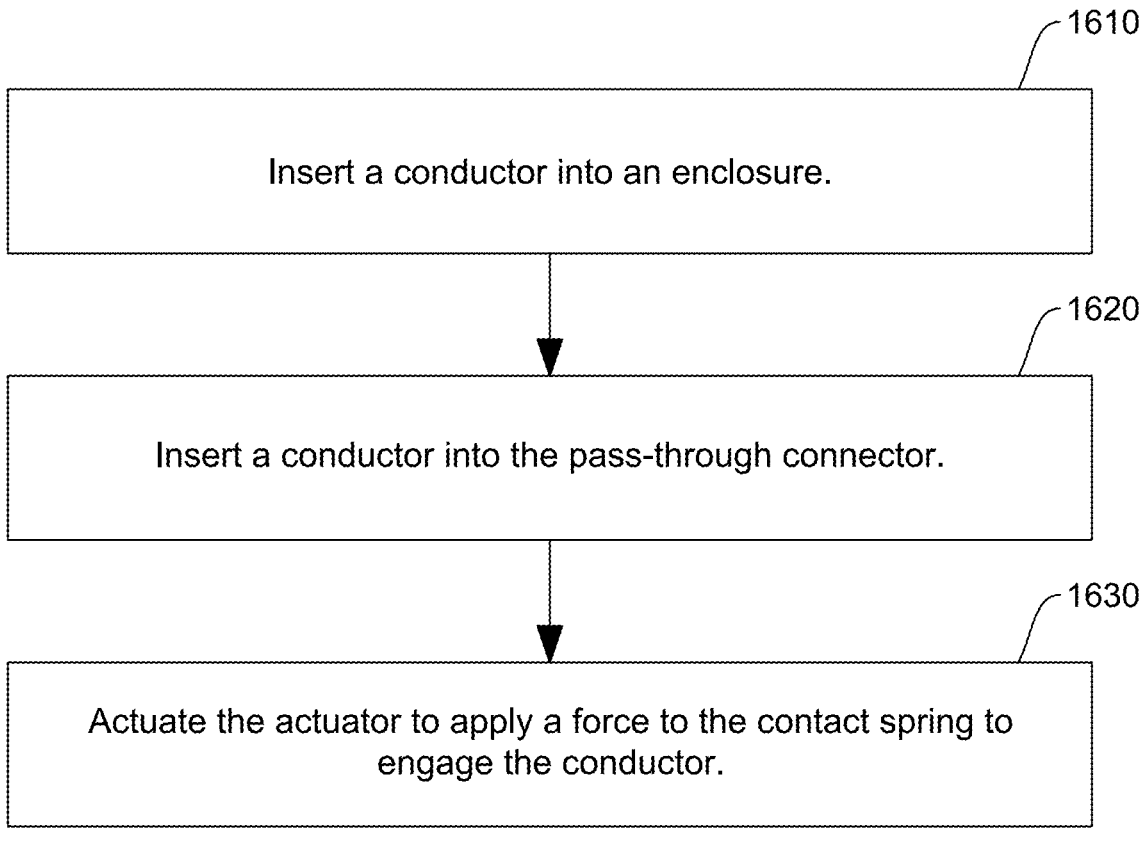
FIG. 16 is a flowchart of an example method for installing and operating an enclosure as described herein.

FIG. 16 is a flowchart of an example method for installing and operating an enclosure as described herein. The method may include one or more steps, including step 1610, 1620, and/or 1630. Though the steps are shown in a particular order, it should be understood that the method 1600 may include fewer, more, or different steps than those shown and described herein. The order of step 1610, 1620, 1630 are for illustrative purposes only, and it should be understood that the method 1600 may be executed in any order without departing from the description herein.

At step 1610, the conductor is inserted into an enclosure (e.g., the enclosure 102 as described herein) through an aperture in the housing of the enclosure. At step 1620, the conductor is inserted into the pass-through connector (e.g., the pass-through connector 410 as described herein) through an opening in the pass-through connector. At step 1630, the actuator 606 is actuated to apply a force to the contact spring to engage the conductor which has been fully inserted in the pass-through connector.

The method 1600 of installing the enclosure may include additional steps. For example, the method 1600 may include determining the desired location on the mounting surface and preparing any necessary fastener holes or conduit pathways. The enclosure is then positioned so that its drop-down is align with the incoming and outgoing wiring routes. Using screws, bolts, or other fasteners compatible with the mounting apertures, the enclosure is secured to the surface (e.g., the roof), ensuring a stable fit that meets local building or electrical codes. In some installations, the enclosure may be attached to a bracket or racking system before final placement, allowing the installer to pre-fit the enclosure at ground level for convenience. In some embodiments, a hole is placed in the roof through which the drop-down is placed.

Once the enclosure is firmly mounted, the lid is removed or hinged open to expose the interior. Any conductor to be passed through the enclosure (e.g., THWN wire or photovoltaic wiring) is stripped to the appropriate length and inserted into the pass-through connector. The installer then moves the actuator from the receiving position to the holding position, thereby pressing the contact spring against the conductor for a secure electrical and mechanical connection. Extension conductors, if present, are similarly routed through the enclosure and connected together with the fastening region of the terminal using crimping or other attachment methods. After confirming all conductors are properly seated and secured, the lid is closed, latched, or fastened, providing environmental protection for the internal components.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

What is claimed is:

1. A system comprising:
an enclosure comprising:
    a housing defining a first aperture and a second aperture; and
    a lid removably coupled to the housing; and
a pass-through connector coupled to an interior surface of the enclosure, the pass-through connector comprising:
    a body having an interior curved edge;
    a cap coupled to the body and defining an interior between the body and the cap, the cap comprising a pivot pin, wherein the pivot pin and the interior curved edge define a channel in the interior;
    a contact spring positioned in part within the channel;
    a terminal having a fastening region and a contact region, wherein the fastening region is positioned exterior to the interior defined by the body and the cap, and wherein the contact region is positioned within the interior defined by the body and the cap; and
    an actuator having a first end and a second end, wherein the second end is in contact with the contact spring.

2. The system of claim 1, further comprising:
an extension conductor coupled to the fastening region of the terminal and extending through the second aperture to an exterior of the housing, the extension conductor having a conductive socket configured to receive a conductive connector from a photovoltaic module.

3. The system of claim 1, wherein the lid is hingedly coupled to the housing.

4. The system of claim 1, wherein the cap further comprises a recess, and wherein the actuator further comprises a protrusion configured to physically engage the recess in a holding position and physically disengage the recess in a receiving position.

5. The system of claim 4, wherein when the actuator is in the holding position, the actuator applies a force on the contact spring so that the contact spring pivots about the pivot pin toward the contact region of the terminal.

6. The system of claim 1, wherein the body further comprises (i) a cap protrusion configured to physically engage with a cap recess in the cap and (ii) a housing protrusion configured to physically engage with a mounting recess in the housing.

7. The system of claim 1, wherein the contact spring comprises a prong that engages a conductor inserted into the body of the pass-through connector when the actuator is in a holding position and applying a force onto an end of the contact spring opposite the prong.

8. The system of claim 1, wherein the actuator is configured to have bimodal stability with a first stable position in a receiving position and a second stable position in a holding position.

9. The system of claim 1, wherein the housing and lid have a height of less than 22 millimeters when coupled together.

10. The system of claim 1, wherein the terminal further comprises at least one wing at the fastening region, wherein the at least one wing is configured to couple to a conductor positioned proximate to the fastening region.

11. The system of claim 1, wherein the terminal further comprises a locating region positioned between the cap and the body, wherein the locating region includes a first bend positioned proximate a wall of the body.

12. The system of claim 1, wherein the cap further comprises a first indication and the actuator comprises a second indication a distance from the first indication, wherein the distance is 20-25 millimeters.

13. The system of claim 1, wherein the actuator further comprises a fulcrum and a spring stop at the second end, wherein the spring stop and the fulcrum form a fork in the second end.

14. A pass-through connector comprising:
a body having an interior curved edge;
a cap coupled to the body and defining an interior between the body and the cap, the cap comprising a pivot pin, wherein the pivot pin and the interior curved edge define a channel in the interior;
a contact spring positioned in part within the channel;
a terminal having a fastening region and a contact region, wherein the fastening region is positioned exterior to the interior defined by the body and the cap, and wherein the contact region is positioned within the interior defined by the body and the cap; and
an actuator having a first end and a second end, wherein the second end is in contact with the contact spring.

15. The pass-through connector of claim 14, wherein the terminal further comprises a locating region positioned between the cap and the body, wherein the locating region includes a first bend proximate a wall of the body.

16. The pass-through connector of claim 14, wherein the cap further comprises a recess, and wherein the actuator further comprises a protrusion configured to physically engage the recess in a holding position and physically disengage the recess in a receiving position.

17. The pass-through connector of claim 16, wherein when the actuator is in the holding position, the actuator applies a force on the contact spring such that the contact spring pivots about the pivot pin toward the contact region of the terminal.

18. The pass-through connector of claim 14, wherein the terminal further comprises at least one wing at the fastening region, wherein the at least one wing is configured to couple to a conductor positioned proximate to the fastening region.

19. The pass-through connector of claim 14, wherein the actuator is configured to have bimodal stability with a first stable position in a receiving position and a second stable position in a holding position.

20. A method comprising:
inserting a conductor into an enclosure, the enclosure comprising:
    a housing defining a first aperture and a second aperture, wherein the conductor is inserted into the first aperture;
    a lid removably coupled to the housing; and a pass-through connector coupled to an interior surface
of the enclosure, the pass-through connector com-
prising:
a body having an interior curved edge;
a cap coupled to the body and defining an interior
between the body and the cap, the cap comprising
a pivot pin, wherein the pivot pin and the interior
curved edge define a channel in the interior;
a contact spring positioned in part within the chan-
nel;
a terminal having a fastening region and a contact
region, wherein the fastening region is positioned
exterior to the interior defined by the body and the
cap, and wherein the contact region is positioned
within the interior defined by the body and the
cap; and
an actuator having a first end and a second end,
wherein the second end is in contact with the
contact spring;
inserting the conductor into the pass-through connector;
and
actuating the actuator to apply a force to the contact spring
to engage the conductor.

\* \* \* \* \*